N. A. NEWDICK.
CONVEYING MECHANISM.
APPLICATION FILED JUNE 26, 1919.
1,375,060.
Patented Apr. 19, 1921.
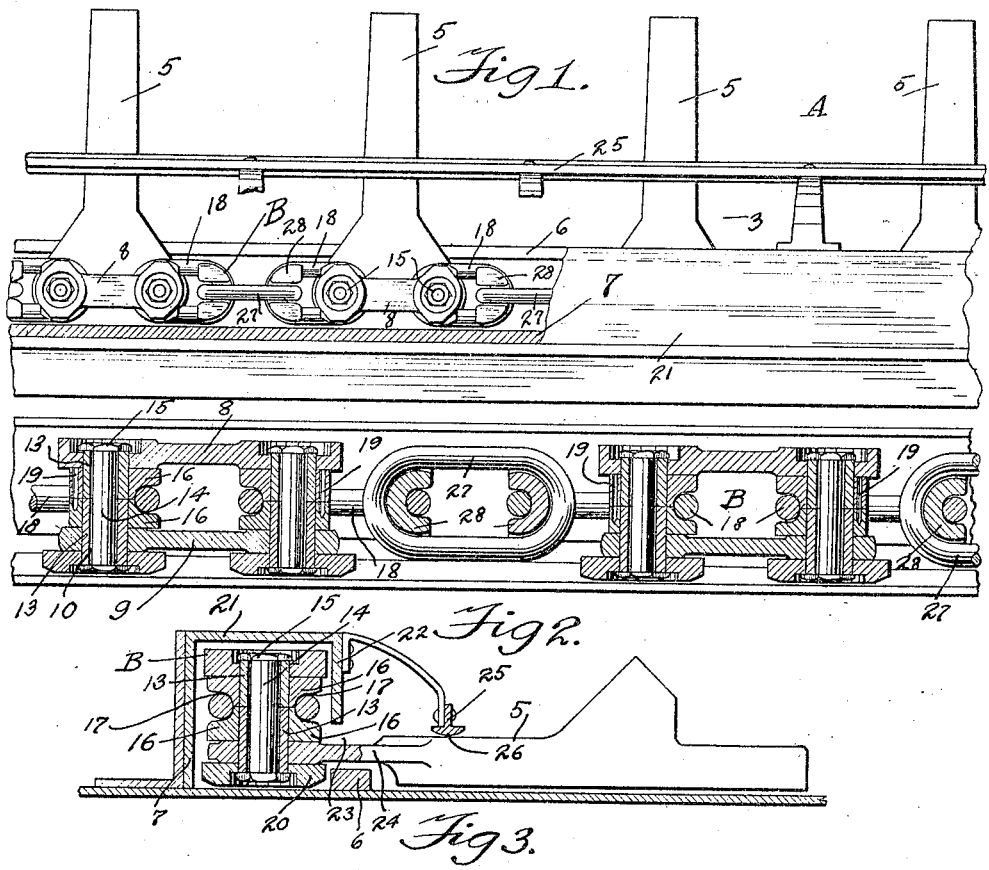
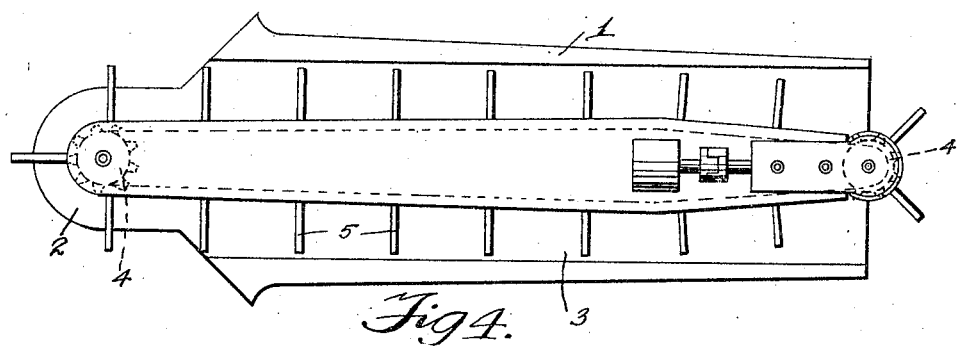
Inventor
Norton A. Newdick.
By C. C. Shepherd.
Attorney

UNITED STATES PATENT OFFICE.

NORTON A. NEWDICK, OF COLUMBUS, OHIO, ASSIGNOR TO JAMES ELLWOOD JONES, OF SWITCHBACK, WEST VIRGINIA.

CONVEYING MECHANISM.

1,375,060.   Specification of Letters Patent.   Patented Apr. 19, 1921.

Application filed June 26, 1919. Serial No. 306,954.

*To all whom it may concern:*

Be it known that NORTON A. NEWDICK, a citizen of the United States, residing at Columbus, in the county of Franklin and State of Ohio, has invented certain new and useful Improvements in Conveying Mechanism, of which the following is a specification.

This invention relates broadly to conveying mechanism, and has particular reference to an improved conveying structure primarily adaptable for use in conjunction with coal loading machines, the object of the invention being to provide a conveying structure composed essentially of a plurality of flight carrying link elements with which are associated improved means for guiding the same during their course of travel, to eliminate undue friction between parts, to retain the desired angularity between the link elements and the flights, to enable the flights to withstand excessive strains and loads, and to protect the chain structure from the material conveyed by the flights.

Another object of the invention resides in a conveyer wherein is provided a frame having stationary and spaced guide members carried thereby whereby the chain structure of the conveyer will be caused to travel between said guide members in parallelism therewith, the chain structure being formed to embody a plurality of link elements which are connected at intervals by means of perpendicular pivot members, which latter being of such construction as to permit of the association of the laterally protruding flights which in reality form a part of the chain structure itself, and to provide the pivot members with rollers which are over said frame and are disposed to engage with either of said guide members, so that the movement of the chain structure as a whole may be facilitated by the elimination to a large extent of friction between the same and said guide members, and to locate the rollers in such relation with respect to said flights that the load carried by the latter will be in a large measure received by the guide members so that the flights and chain links may be relieved of severe pressures and strains and the desired angularity of the flights preserved.

A further object of the invention resides in inclosing the chain structure so that the dirt or grit of the material conveyed by the flights will be kept out of the joints of the chain structure and in this manner the wearing properties of the latter enhanced, and to provide the casing of the link structure with an improved guide disposed to project into guiding relation with respect to the flights throughout all positions of travel of the latter, said auxiliary guide serving to prevent undue movement on part of the flights in an upward direction and in this manner to render the same more efficient in their conveying activities.

Other objects will be in part obvious and in part pointed out hereinafter in the following claims.

In the accompanying drawings, forming a part of this specification and in which similar characters of reference denote like and corresponding parts:

Figure 1 is a top plan view of the conveying mechanism comprising the present invention, Fig. 2 is a vertical longitudinal sectional view taken along the line 2—2 of Fig. 1.

Fig. 3 is a transverse sectional view taken along the line 3—3 of Fig. 1, and

Fig. 4 is a plan view of the loading machine with which the conveying mechanism is employed.

The conveying mechanism A comprising the present invention is primarily adapted to be employed in connection with a coal loading machine 1, the latter may be of a type disclosed in my co-pending application bearing Serial Number 302,914 filing date June 9, 1919. In the machine 1 there is provided a forwardly situated nose portion 2, a conveying frame 3 and sprocket wheels 4, the latter being situated at the forward and rear portions of the frame 3 and over which is trained a chain structure B, the latter carrying perpendicular extending flights 5, whereby when the chain structure is in motion, said flights will be caused to enter a coal pile and to force the material contained in the latter upwardly along the frame 3, from which it is discharged into suitable cars for purposes of transportation.

Obviously, in undertaking work of this character it is essential that the mechanism A be of very stanch and reliable construction since if the same should become injured in any manner the operation of the machine is halted until suitable repairs have been made. Hence, it is the purpose of the present invention to provide a structure fully capable of withstanding the stresses incident to the conveying of coal from its face or seam to suitable containers, to enable the mechanism to successfully withstand long and continued usage, and in the event of damage to any of the component parts thereof to permit such damage to be readily repaired with but a minimum of time and loss.

Mounted upon the frame 3 are a plurality of spaced and longitudinally extending guide members 6 and 7 which are spaced to receive the chain structure B and to permit the latter to move in parallelism with said guide members upon the rotation of the sprocket wheels 4. The chain structure preferably consists of a plurality of spaced and parallel link bars 8 and 9 in which are formed registering openings 10, and passing through said openings are split tubular bushings 13 which, in turn, are disposed to receive headed bolt members 14, the threaded ends of the latter being provided with nuts 15. This arrangement of the bolt members is such that upon the tightening up of the nuts 15 the bushings 13 will be placed under compressive stresses so that the friction exerted by the nuts 15 will be directly received by the bushings 13 so that the outward movement only of the link bars 8 and 9 will be limited. Surrounding the bushings 13 and interposed between the link bars 8 and 9 are a plurality of split collars 16, which are grooved as at 17 to receive the horizontal link elements 18 of the structure B. Relative movement between the collars 16 is prevented by means of dowel pins 19. It will thus be apparent that through the provision of the bolt members described that a structure has been provided for rigidly and securely uniting the link bars 8 and 9 and their associated parts but that through the provision of the bushings 13 the friction placed upon said link bars will not be sufficient to impair the horizontal flexibility of the chain structure as a whole, and furthermore said bushings serve to receive the wear of the chain and to permit of the rapid repair of any fractured part thereof.

Rotatable about the lower ends of the bolt members 14 are a plurality of rollers or equivalent anti-friction devices 20, which are adapted to be positioned so as to engage with one or the other of the guide members 6 and 7, so that the movement of the chain structure as a whole between said guides will be facilitated, undue friction obviated and successful operation of the mechanism effected with but a minimum expenditure of power. It will be observed that when the flights 5 are traveling upwardly of the frame 3 and under loaded conditions, the rollers 20 will be caused to oscillate so that the upper or advance roller will engage with the guide member 6 and the following roller with the guide member 7, and this engagement will result in the proper angular positioning of the flights 5. It will thus be evident that the rollers 20 guide the movements of the flights 5 and permit the latter to ride upon what is in effect a wheeled carriage, so that the movement of the flights may be accomplished with but a minimum of friction, moreover, by passing the bolt members 14 through spaced positions of each flight the true operative position of the latter will be maintained so that the conveying structure may operate with maximum efficiency.

The structure B is housed by forming the guide member 7 of channel construction, so that the same will include an upper wall 21 and a depending side wall 22, which is located in registration with the guide member 6, but is spaced from the latter to provide a slot 23, through which the connecting webs 24 of the flights extend. By thus housing the structure B the same will be protected from the material carried by the flights, and in this manner the life of the chain structure will be materially extended. To prevent vertical raising of the flights, or the disengagement of the latter with the material it is conveying along the frame 3, use is made of an auxiliary guide 25. This latter guide extends rigidly from the wall 22 and is provided with a bearing portion 26 which is disposed immediately above the flights 5 and in spaced relation from the frame 3. By virtue of this construction it will be apparent that movement of the flights away from the floor of the frame 3 will be effectively precluded by the auxiliary guide 25 and in this manner close engagement between the flights and the material they are carrying will be maintained.

Interposed between the flights 5 and forming a part of the structure B are a plurality of vertical link elements 27, which are arranged to be received within grooved wearing plates 28 fitted upon the ends of the elements 18. This manner of coupling the elements 18 and 27 furnishes an exceptionally substantial construction and contributes toward the general strength of the conveying mechanism.

From the foregoing description taken in connection with the accompanying drawing, it will be apparent that there is provided a conveying mechanism of considerable utility, and one which is capable of imparting extended serivce under very difficult conditions with but a minimum of breaks or repairs. Furthermore, the structure is so assembled as to permit a damaged part to be quickly and readily removed from the mechanism and a new part inserted in lieu thereof. By terminating the channeled guide member 7 adjacent to one of the sprockets 4, any part of the chain structure B will be rendered readily accessible. The teeth of the sprockets are so spaced as to be capable of readily entering the interstices of the chain structure, so that the movement of the latter will take place upon the rotation of the sprockets. Through the provision of the rollers 20 movement of the chain structure as a whole will be facilitated, stresses imparted to the flights will be readily taken care of, and the lateral positioning of the flights with respect to the guide members 6 and 7 will be insured.

What I claim is:

1. In a conveyer, the combination with a frame, a pair of spaced and stationary longitudinally extending guide members carried by said frame, of a chain structure located between and movable in parallelism with said members, said structure comprising a plurality of link elements articulately connected at intervals by means of pivot members, flight elements connected with and protruding laterally from said pivot members, and devices mounted to rotate about the lower extremities of said pivot members whereby when said flights are placed under load conditions said devices will be caused to engage with said guide members to facilitate the movement of the chain structure.

2. In a conveyer, the combination with a frame, a pair of spaced and stationary longitudinally extending guide members carried by said frame, of a chain structure located between and movable in parallelism with said members, said structure comprising a plurality of link elements articulately connected at intervals by means of pivot members, flight elements connected with and protruding laterally from said pivot members, devices mounted to rotate about the lower extremities of said pivot members whereby when said flights are placed under load conditions said devices will be caused to engage with said guide members to facilitate the movement of the chain structure, and a housing arranged to substantially incase said chain structure.

3. In a conveyer, the combination with a frame, a pair of spaced and stationary longitudinally extending guide members carried by said frame, of a chain structure located between and movable in parallelism with said members, said structure comprising a plurality of link elements articulately connected at intervals by means of pivot members, flight elements connected with and protruding laterally from said pivot members, devices mounted to rotate about the lower extremities of said pivot members whereby when said flights are placed under load conditions said devices will be caused to engage with said guide members to facilitate the movement of the chain structure, a housing arranged to substantially incase said chain structure, said housing having a slot formed therein to which the flights project, and an auxiliary guide structure projecting laterally from said housing and arranged to coöperate with said flights and points lateral to the housing.

In testimony whereof I affix my signature.

NORTON A. NEWDICK.